United States Patent
Watanabe

(10) Patent No.: US 8,930,910 B2
(45) Date of Patent: Jan. 6, 2015

(54) INFORMATION PROCESSING APPARATUS, INFORMATION PROCESSING METHOD, AND PROGRAM

(75) Inventor: Hidehiko Watanabe, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 538 days.

(21) Appl. No.: 12/829,785

(22) Filed: Jul. 2, 2010

(65) Prior Publication Data

US 2011/0010649 A1 Jan. 13, 2011

(30) Foreign Application Priority Data

Jul. 7, 2009 (JP) .................................. 2009-161104

(51) Int. Cl.
*G06F 9/44* (2006.01)
*G06F 17/00* (2006.01)
*G06F 3/033* (2013.01)
*G06F 9/445* (2006.01)
*G06F 11/36* (2006.01)
*G06F 11/00* (2006.01)

(52) U.S. Cl.
CPC ............... *G06F 9/445* (2013.01); *G06F 11/36* (2013.01); *G06F 11/362* (2013.01); *G06F 11/00* (2013.01)
USPC ........... 717/125; 717/124; 717/172; 715/234; 715/764

(58) Field of Classification Search
CPC ............. G06F 8/10; G06F 8/44; G06F 8/433; G06F 8/67
USPC ........................................................ 715/764
See application file for complete search history.

(56) References Cited

U.S. PATENT DOCUMENTS

| | | | | |
|---|---|---|---|---|
| 5,950,012 A * | 9/1999 | Shiell et al. | .................... | 717/169 |
| 7,266,819 B2 * | 9/2007 | Helgesen et al. | ............. | 717/176 |
| 7,739,677 B1 * | 6/2010 | Kekre et al. | .................... | 717/168 |
| 8,194,273 B2 * | 6/2012 | Yokokura | .................... | 358/1.15 |
| 2002/0089542 A1 * | 7/2002 | Imamura | ........................ | 345/764 |
| 2002/0093010 A1 * | 7/2002 | Sosebee et al. | ............... | 252/601 |

(Continued)

FOREIGN PATENT DOCUMENTS

| | | |
|---|---|---|
| JP | 2004-139572 | 5/2004 |
| JP | 2004-287993 | 10/2004 |
| JP | 2008-269163 | 11/2008 |

OTHER PUBLICATIONS

Office Action issued in Japanese Application No. 2009-161104 on Mar. 19, 2013.

*Primary Examiner* — Don Wong
*Assistant Examiner* — Mohammad Kabir
(74) *Attorney, Agent, or Firm* — Oblon, Spivak, McClelland, Maier & Neustadt, L.L.P.

(57) ABSTRACT

An information processing apparatus is disclosed that includes a list information storage unit that stores list information on additional programs having been transmitted to equipment connected via a network, the additional programs capable of dynamically interrupting another program of the equipment with processing thereof; a combination information storage unit that stores combination information indicating a combination of the additional programs, the combination showing that the additional programs are capable of being activated; a determination unit that determines whether an activation of the additional programs having been transmitted to the equipment is possible based on the list information and the combination information; and a transmission unit that transmits the additional program deficient in the combination indicated by the combination information to the equipment if the activation of the additional programs is determined to be impossible. The additional programs dynamically interrupt the another program with the processing thereof when being activated.

10 Claims, 14 Drawing Sheets

(56) References Cited

U.S. PATENT DOCUMENTS

| | | | |
|---|---|---|---|
| 2002/0124014 A1* | 9/2002 | Noguchi | 707/204 |
| 2003/0084434 A1* | 5/2003 | Ren | 717/172 |
| 2005/0015433 A1* | 1/2005 | Nakamura | 709/201 |
| 2005/0066325 A1* | 3/2005 | Mori et al. | 717/174 |
| 2005/0235294 A1* | 10/2005 | Kimura et al. | 719/328 |
| 2006/0037012 A1* | 2/2006 | Zomaya et al. | 717/168 |
| 2006/0048129 A1* | 3/2006 | Napier et al. | 717/168 |
| 2007/0177196 A1* | 8/2007 | Maeda | 358/1.15 |
| 2008/0201705 A1* | 8/2008 | Wookey | 717/175 |
| 2008/0288988 A1* | 11/2008 | Yabe | 725/91 |
| 2009/0064019 A1* | 3/2009 | Cahill et al. | 715/765 |
| 2010/0229083 A1* | 9/2010 | Mouri et al. | 715/234 |

* cited by examiner

FIG.8

| EQUIPMENT NAME | ADDITIONAL PROGRAM NAME | STATUS | PROGRAM ID | VERSION |
|---|---|---|---|---|
| AAA | SCAN RESOLUTION ENHANCEMENT PATCH | TRANSMITTED | S001V11 | Ver1.1 |
| AAA | IMAGE PROCESSING FUNCTION ADDITION PATCH | TRANSMITTED | G002V11 | Ver1.1 |

FIG.10

| OBJECT | ADDITIONAL PROGRAM NAME | PROGRAM ID | VERSION |
|---|---|---|---|
| FUNCTION EXPANSION: ENHANCEMENT OF COPY RESOLUTION | SCAN RESOLUTION ENHANCEMENT PATCH | S001V11 | Ver1.1 |
| | IMAGE PROCESSING FUNCTION ADDITION PATCH | G002V11 | Ver1.1 |
| | PRINT FUNCTION ADDITION PATCH | P001V12 | Ver1.2 |
| FUNCTION EXPANSION: ENHANCEMENT OF ScanToEmail RESOLUTION | SCAN RESOLUTION ENHANCEMENT PATCH | S001V11 | Ver1.1 |
| | IMAGE PROCESSING FUNCTION ADDITION PATCH | G002V11 | Ver1.1 |
| | E-MAIL TRANSMISSION FUNCTION ADDITION PATCH | M001V10 | Ver1.0 |

FIG.12

ACTIVATION OF ADDITIONAL PROGRAMS 720

| OBJECT | ADDITIONAL PROGRAM NAME | STATUS | ACTIVATION BUTTON |
|---|---|---|---|
| ENHANCEMENT OF COPY RESOLUTION | SCAN RESOLUTION ENHANCEMENT PATCH | TRANSMITTED | ACTIVATION 721 |
| | IMAGE PROCESSING FUNCTION ADDITION PATCH | TRANSMITTED | |
| | PRINT FUNCTION ADDITION PATCH | NOT TRANSMITTED | |
| ENHANCEMENT OF ScanToEmail RESOLUTION | SCAN RESOLUTION ENHANCEMENT PATCH | TRANSMITTED | ACTIVATION 722 |
| | IMAGE PROCESSING FUNCTION ADDITION PATCH | TRANSMITTED | |
| | E-MAIL TRANSMISSION FUNCTION ADDITION PATCH | NOT TRANSMITTED | |
| | .. | .. | .. |

TRANSMISSION 725

INFORMATION PROCESSING APPARATUS, INFORMATION PROCESSING METHOD, AND PROGRAM

BACKGROUND OF THE INVENTION

1. Field of the Invention

The present invention relates to information processing apparatuses, information processing methods, and programs. In particular, the present invention relates to an information processing apparatus that transmits to equipment a program for dynamically interrupting another program with its processing. Also, the present invention relates to an information processing method and a program used for the information processing apparatus.

2. Description of the Related Art

Up until now, as a general operation for analyzing a failure (such as debugging) in a program that operates particularly in embedded equipment, etc., a log output from the program is analyzed. In other words, in various parts of the source code of the program are embedded the value of a variable used by the program and instructions (e.g., the printf function in the C language) for outputting information indicating the status of hardware where the program operates, etc., to a log file. Therefore, if a failure occurs, a log file output according to such an instruction (hereinafter referred to as a "log output instruction") is analyzed to estimate or specify a reason of the failure.

However, when specific analysis is performed using the log file output (first-output log file) according to the embedded log output instruction, the log file is often insufficient as information. In this case, a part causing a failure is specified to some extent based on the first-output log file. Then, in order to output a more specific log on parts around the part causing the failure involved, the source code of the program is corrected. After the compilation and linkage of the source code, the program is replaced. If a reason cannot be specified by a subsequently-output log file, another log output instruction is embedded in the source code and the above operations are repeatedly performed. Thus, when a failure is analyzed based on a log, very complicated operations are required as occasion demands.

A known technology for dealing with this problem includes dynamically interrupting any part (diagnostic part) of an operating program with the processing of a diagnostic program (at its execution). With the diagnostic program, the value of the variable of a program to be diagnosed, etc., can be referred to. When the processing of the diagnostic program is completed, the processing is returned to the part of the program to be diagnosed in which the diagnostic program has interrupted. This technology makes it possible to output the log of the program to be diagnosed using the diagnostic program without correcting the source code of the program to be diagnosed. Since the source code can be dynamically corrected with this technology, changes in the behavior of the program as well as the diagnostic program for debugging enable the addition of a new function to the program and the correction of bugs.

However, in case that one function is extended or one bug is corrected, plural additional programs may be required. In this case, if there is a deficiency in any part of the plural additional programs, the object of extending the function, correcting the bug, etc., may not be successful and a stable operation of a program to be applied may not be guaranteed.

Patent Document 1: JP-A-2008-269163

SUMMARY OF THE INVENTION

The present invention has been made in light of the above drawbacks and may provide an information processing apparatus capable of assisting the proper application of a program for dynamically interrupting another program with its processing. Also, the present invention may provide an information processing method and a program used for the information processing apparatus.

According to an aspect of the present invention, there is provided an information processing apparatus including a list information storage unit that stores list information on additional programs having been transmitted to equipment connected via a network, the additional programs capable of dynamically interrupting another program of the equipment with processing thereof; a combination information storage unit that stores combination information indicating a combination of the additional programs, the combination showing that the additional programs are capable of being activated; a determination unit that determines whether an activation of the additional programs having been transmitted to the equipment is possible based on the list information and the combination information; and a transmission unit that transmits the additional program deficient in the combination indicated by the combination information to the equipment if the activation of the additional programs is determined to be impossible. The additional programs dynamically interrupt said another program with the processing thereof when being activated.

With the information processing apparatus, it is possible to assist the proper application of the program capable of dynamically interrupting another program with its processing.

According to an embodiment of the present invention, it is possible to assist the proper application of the program capable of dynamically interrupting another program with its processing.

Other objects, features and advantages of the present invention will become more apparent from the following detailed description when read in conjunction with the accompanying drawings.

BRIEF DESCRIPTION OF THE DRAWINGS

FIG. 8 is a diagram showing a configuration example of a status information storage unit;

FIG. 10 is a diagram showing a configuration example of a combination information storage unit;

FIG. 12 is a diagram showing a display example of an activation screen;

DETAILED DESCRIPTION OF THE PREFERRED EMBODIMENTS

Figure 1:
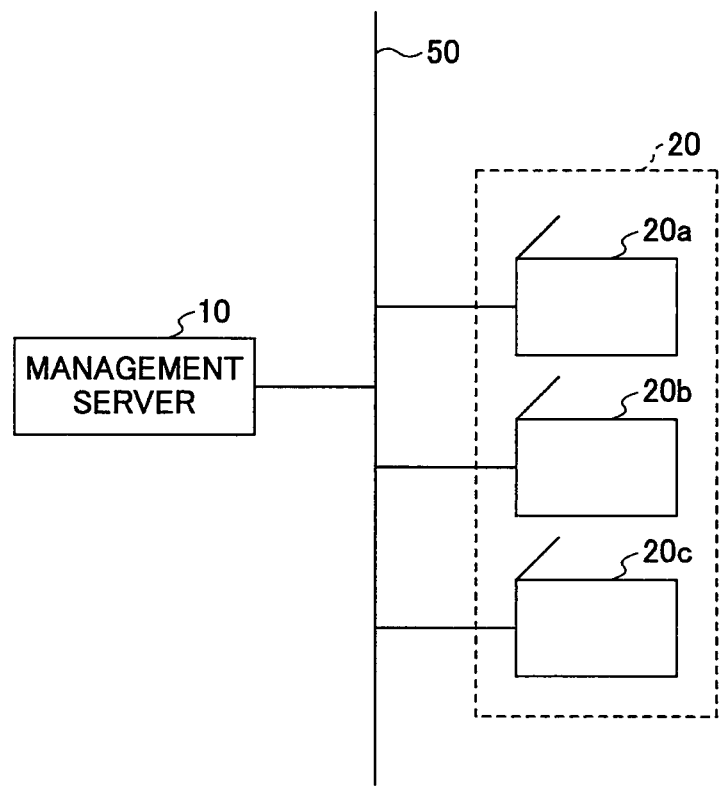
FIG. 1 is a diagram showing a configuration example of an equipment management system according to an embodiment of the present invention.

Next, an embodiment of the present invention is described with reference to the accompanying drawings. FIG. 1 is a diagram showing a configuration example of an equipment management system according to the embodiment of the present invention. In the equipment management system 1 shown in FIG. 1, a management server 10, equipment 20a, equipment 20b, and equipment 20c (hereinafter referred to as "equipment 20" when they are collectively called) are connected to one another via a network 50 (regardless of whether it is a wire connection or a wireless connection) such as a LAN (Local Area Network) or the Internet.

The equipment 20 is an image forming apparatus (multi-function machine) that implements the plural functions of a copier, a facsimile machine, a printer, a scanner, etc., in a single housing. The equipment 20a has a CPU and a memory, and implements various functions based on the control of the CPU according to a program recorded in the memory.

The management server 10 is a computer that performs the management of an additional program applied to another program used in the equipment 20, the transfer of the additional program to the equipment 20, etc. In the embodiment, the additional program is a program capable of dynamically interrupting any part of another program with processing defined in the additional program.

Figure 2:
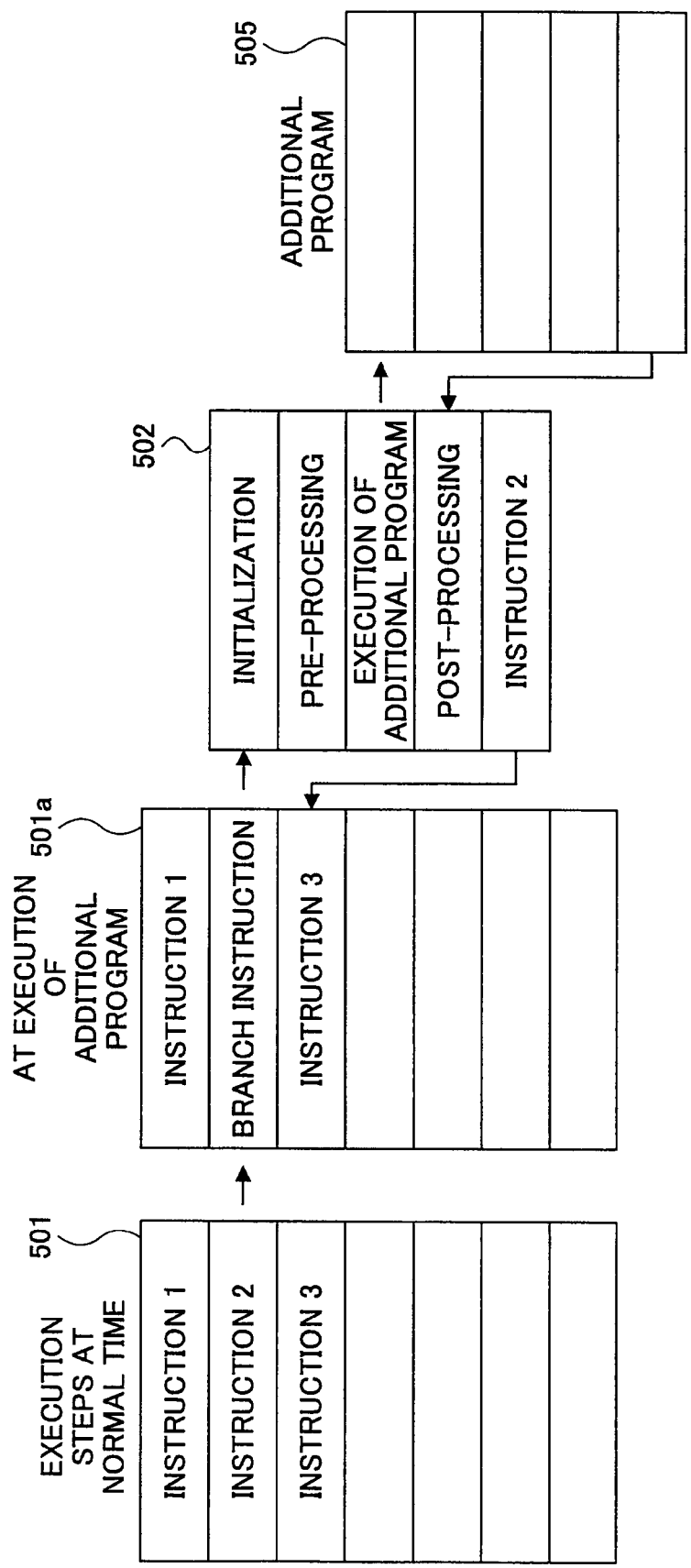
FIG. 2 is a diagram for explaining a brief overview of an additional program.

FIG. 2 is a diagram for explaining a brief overview of the additional program. In FIG. 2, reference numeral 501 denotes the arrangement of instructions on a virtual memory in a program to which the additional program 505 is applied. The program 501 executes its processing in the order from the instruction 1 to the instruction 3 (at a normal execution time) before the additional program 505 is applied to the program 501. Reference numeral 501a denotes a state in which the additional program 505 is applied to the program 501. Here, an example is shown in which the processing of the additional program 505 is interrupted between the instruction 1 and the instruction 2. In this case, the instruction 2 is replaced by an instruction for branching the processing (branch instruction) into a table 502. The table 502 is defined such that the processing is executed in the order from initialization processing, pre-processing (saving of a variable in a stack, etc.), processing for executing the additional program 505, post-processing (fetching of the variable saved in the stack, etc.), and the instruction 2. After the execution of the instruction 2, the processing is returned to the instruction 3 in the program 501a.

In other words, in the case of applying the additional program, the processing of the additional program is executed when the execution step of the program, to which the additional program is applied (hereinafter referred to as an object program), reaches a predetermined position (addition position). When the processing of the additional program is completed, the processing control is returned to the object program. Then, the object program restarts its processing from the addition position. Note that the additional program includes, in addition to processing to be interrupted in the object program, information for identifying the object program and the addition position.

In the additional program, the variable, etc., of the object program can be referred to. Accordingly, the additional program makes it possible to interrupt the object program with processing for outputting log information indicating the value of a variable, etc., at any position of the object program, processing for correcting a bug, processing for implementing a new function, etc.

With this additional program, it is possible to output log information, correct a bug, or enhance a function without performing the correction, compilation, and linkage of a source code and reinstallation (i.e., in a dynamic manner) with respect to the object program.

Note that in the embodiment, the additional program is in any status of "not transmitted," "transmitted," or "activated," etc., corresponding to the equipment 20. The status "not transmitted" shows that the additional program has not been transmitted from the management server 10 to the equipment 20. The status "transmitted" shows that the additional program has been transmitted from the management server 10 to the equipment 20. The status "activated" shows that the function of the additional program is activated. In other words, as shown in FIG. 2, the status "activated" is a status in which the additional program is capable of being applied to the object program to interrupt the same with its processing. Note that activating the additional program, which has been transmitted to the equipment, is called "activation."

Figure 3:
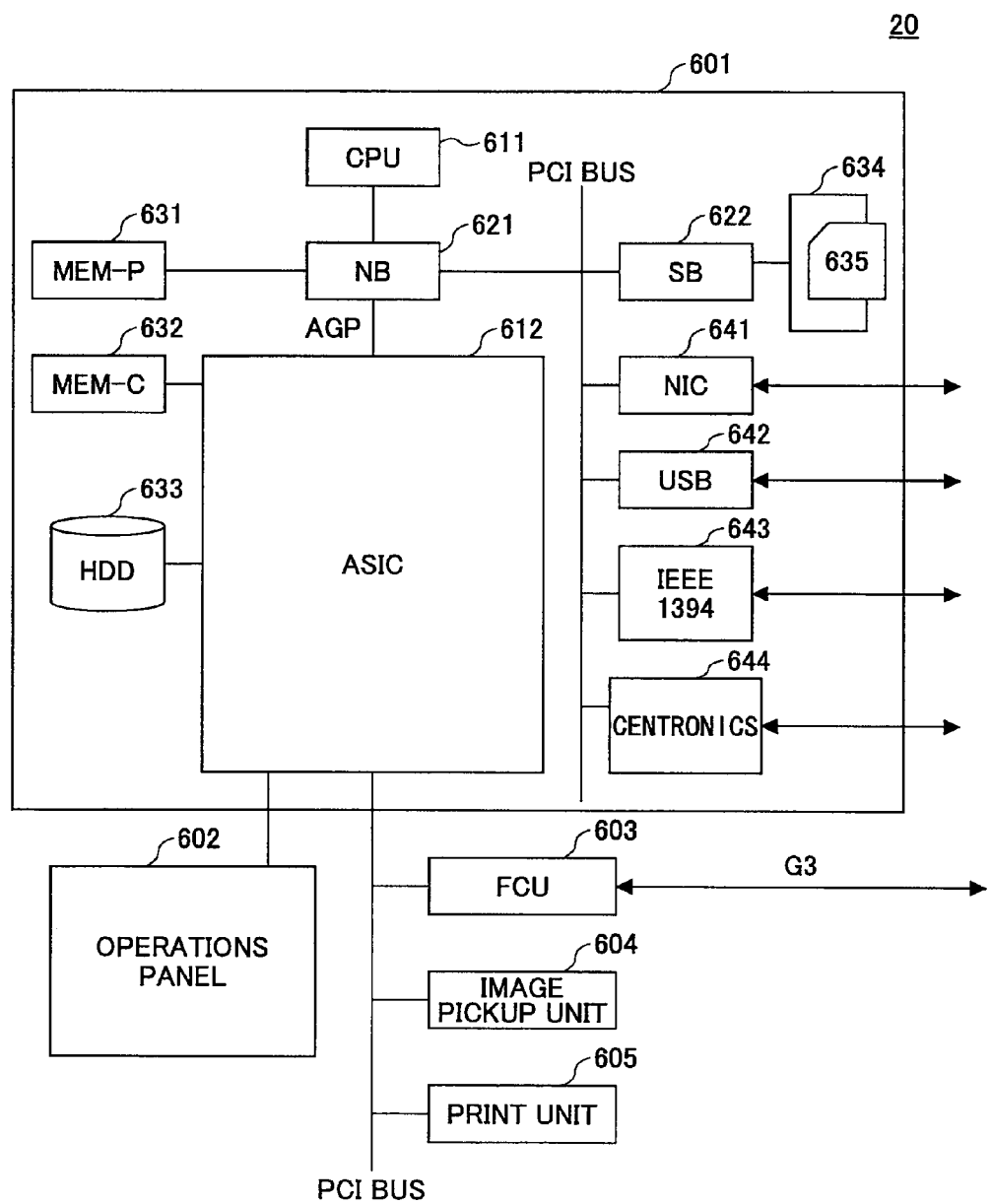
FIG. 3 is a diagram showing a hardware configuration example of equipment according to the embodiment of the present invention.

Here, the equipment 20 is described in detail. FIG. 3 is a diagram showing a hardware configuration example of the equipment according to the embodiment of the present invention. As shown in FIG. 3, the equipment 20 has a controller 601, an operations panel 602, a facsimile control unit (FCU) 603, an image pickup unit 604, a print unit 605, etc.

The controller 601 has a CPU 611, an ASIC 612, a NB 621, a SB 622, a MEM-P 631, a MEM-C 632, a HDD (Hard Disk Drive) 633, a memory card slot 634, a NIC (Network Interface Controller) 641, a USB device 642, an IEEE1394 device 643, and a Centronics device 644.

The CPU 611 is an IC that processes various information items. The ASIC 612 is an IC that processes various images. The NB 621 is a north bridge of the controller 601. The SB 622 is a south bridge of the controller 601. The MEM-P 631 is a system memory of the equipment 20. The MEM-C 632 is a local memory of the equipment 20. The HDD 633 is a storage of the equipment 20. The memory card slot 634 is a slot that receives a memory card 635. The NIC 641 is a controller for network communications using a MAC address. The USB device 642 is a device that provides a connection terminal of a USB standard. The IEEE1394 device 643 is a device that provides a connection terminal of an IEEE1394 standard. The Centronics device 644 is a device that provides a connection terminal of Centronics specifications. The operations panel 602 serves not only as hardware (operations unit) through which an operator inputs data to the equipment 20 but also as hardware (display unit) through which the operator receives outputs from the equipment 20.

Figure 4:
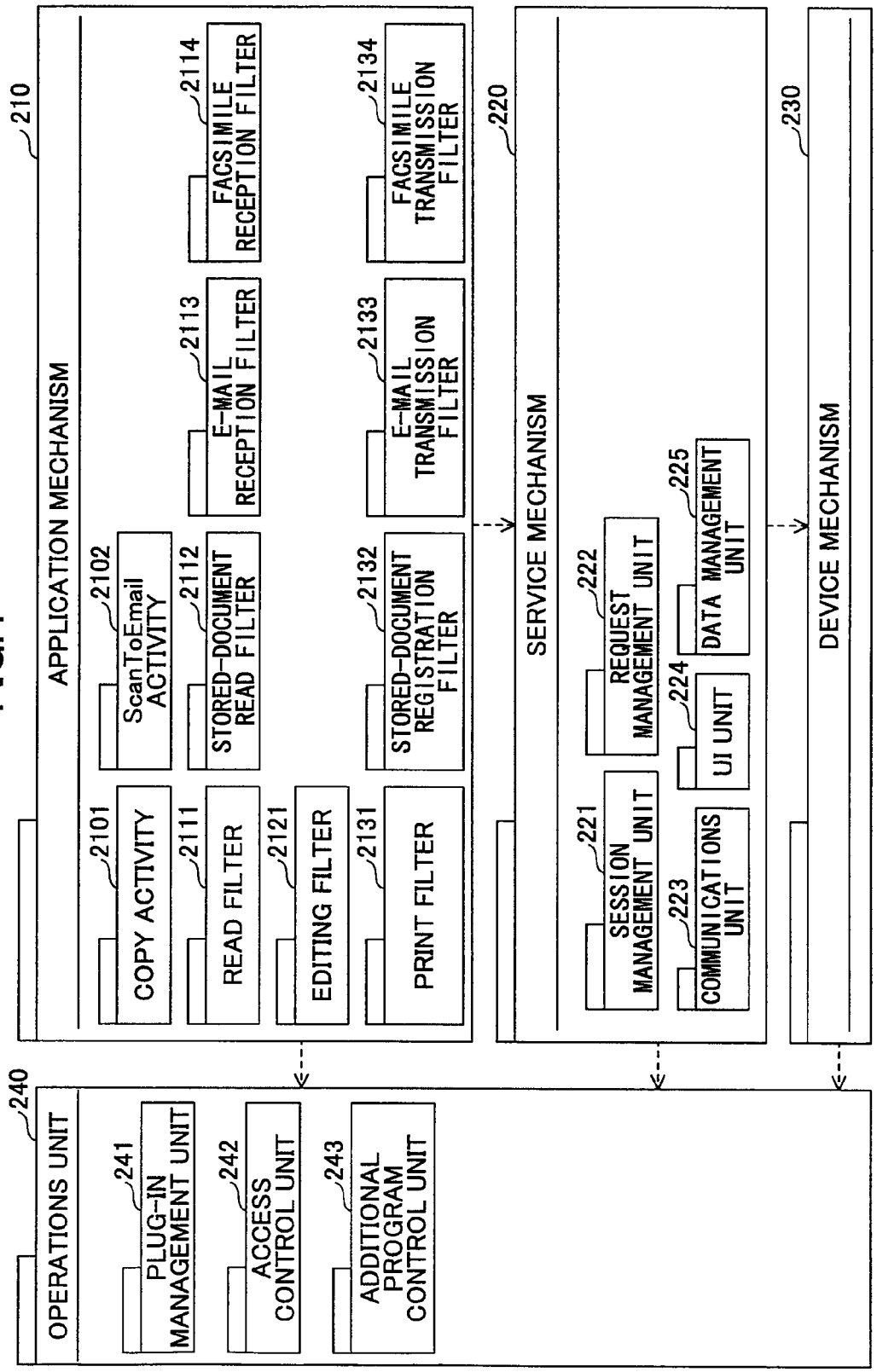
FIG. 4 is a diagram showing a software configuration example of the equipment according to the embodiment of the present invention.

FIG. 4 is a diagram showing a software configuration example of the equipment according to the embodiment of the present invention. As shown in FIG. 4, software in the equipment 20 has layers composed of an application mechanism 210, a service mechanism 220, a device mechanism 230, an operations unit 240, etc. A hierarchical relationship between the layers is based on an invoking relationship between the layers. That is, in FIG. 4, the upper layers basically invoke the lower layers.

The application mechanism 210 is the layer that includes a group of software components (programs) that allows the user to use resources such as functions or information (data) provided by the equipment 20. Among the software components, those named as "XXX filters" are collectively called "filters." Each of the filters is the software component that executes part of a job. In other words, each of the filters is not allowed to execute a job by itself. It is not until the plural filters are connected to one another that an application for executing a job is constructed.

The filter that inputs image data is specifically called an "input filter." The filter that processes image data is specifically called a "process filter." The filter that outputs image data is called an "output filter." Note that the filters can be added (installed) or deleted (uninstalled) separately.

As shown in FIG. 4, the application mechanism 210 includes a read filter 2111, a stored-document read filter 2112, an E-mail reception filter 2113, a facsimile reception filter 2114, etc., as the input filters.

The read filter 2111 controls reading of image data by the image pickup unit 604 and outputs the read image data to a next-connected filter (hereinafter referred to as a "next filter"). The stored-document read filter 2112 reads document data (image data) stored in a storage unit of the equipment 20 and outputs the read data to a next filter. The E-mail reception filter 2113 receives E-mails and outputs data contained in the E-mails to a next filter. The facsimile reception filter 2114 controls reception of facsimiles and outputs received print data to a next filter.

Further, the application mechanism 210 includes an editing filter 2121 as the process filter. The editing filter 2121 applies predetermined image conversion processing (such as aggregation, enlargement, or reduction) to input data and outputs the converted data to a next filter.

Further, the application mechanism 210 includes a print filter 2131, a stored-document registration filter 2132, an E-mail transmission filter 2133, a facsimile transmission filter 2134, etc., as the output filters.

The print filter 2131 causes a plotter to output (print) input data. The stored-document registration filter 2132 stores input data in the storage unit, e.g., the HDD 633 of the equipment 20. The E-mail transmission filter 2133 transmits input data attached to E-mails. The facsimile transmission filter 2134 transmits input data by facsimile.

On the other hand, the software components named as "XXX activities" are collectively called "activities." The activities are the software components that manage the order of connecting the plural filters and execute the filters in this order to execute a job. Basically, one application is implemented by one activity. Note that the same filter can be shared between the activities.

In FIG. 4, the application mechanism 210 includes a copy activity 2101, a ScanToEmail activity 2102, etc., as examples of the activities. For example, the copy activity 2101 executes a copy job by combining the read filter 2111, the editing filter 2121, and the print filter 2131 with each other. The ScanToEmail activity 2102 executes an E-mail transfer job for a scan image by combining the read filter 2111, the editing filter 2121, and the E-mail transmission filter 2133 with each other. Although many other activities can be executed depending on the combination of the filters, they are omitted in the embodiment.

The service mechanism 220 is the layer that includes primitive services used by the activities, the filters, etc., and provides a mechanism that makes applications being independent from hardware specifications such as machine models. In FIG. 4, the service mechanism 220 includes a session management unit 221, a request management unit 222, a communications unit 223, a UI unit 224, a data management unit 225, etc.

The session management unit 221 manages an authentication status (login status) of the user. For example, the session management unit 221 authenticates the user based on authentication information (such as a user name and a password) input by the user and identifies the user at log-in. The request management unit 222 manages jobs. The communications unit 223 controls network communications. The UI unit 224 interprets the demand of the user input through an operations screen displayed on the operations panel 602, and requests the request management unit 222 to execute jobs corresponding to the demand of the user. The data management unit 225 manages image data that are scanned and stored in the HDD 633, bibliographical information of the image data, etc.

The device mechanism 230 includes a driver program, etc., that controls a device provided for each device of the equipment 20.

The operations unit 240 is a part in which software components related to system operations management are mounted and which is used by the application mechanism 210, the service mechanism 220, and the device mechanism 230 in a cross-sectoral manner. As shown in FIG. 4, the operations unit 240 includes a plug-in management unit 241, an access control unit 242, and an additional program control unit 243. The plug-in management unit 241 manages information on the software components (plug-ins) capable of being freely inserted and extracted (installed and uninstalled) such as the activities and the filters. The access control unit 242 determines whether each user is allowed to use various functions (whether each user has a right to use various functions) based on use right information. Here, the use right information is information that records (defines) whether each user has a right to use various functions, and is recorded in the HDD 633. The additional program control unit 243 controls the execution of the additional program described above. For example, the additional program control unit 243 receives the additional program transferred from the management server 10 and applies the received program to an object program.

Figure 5:
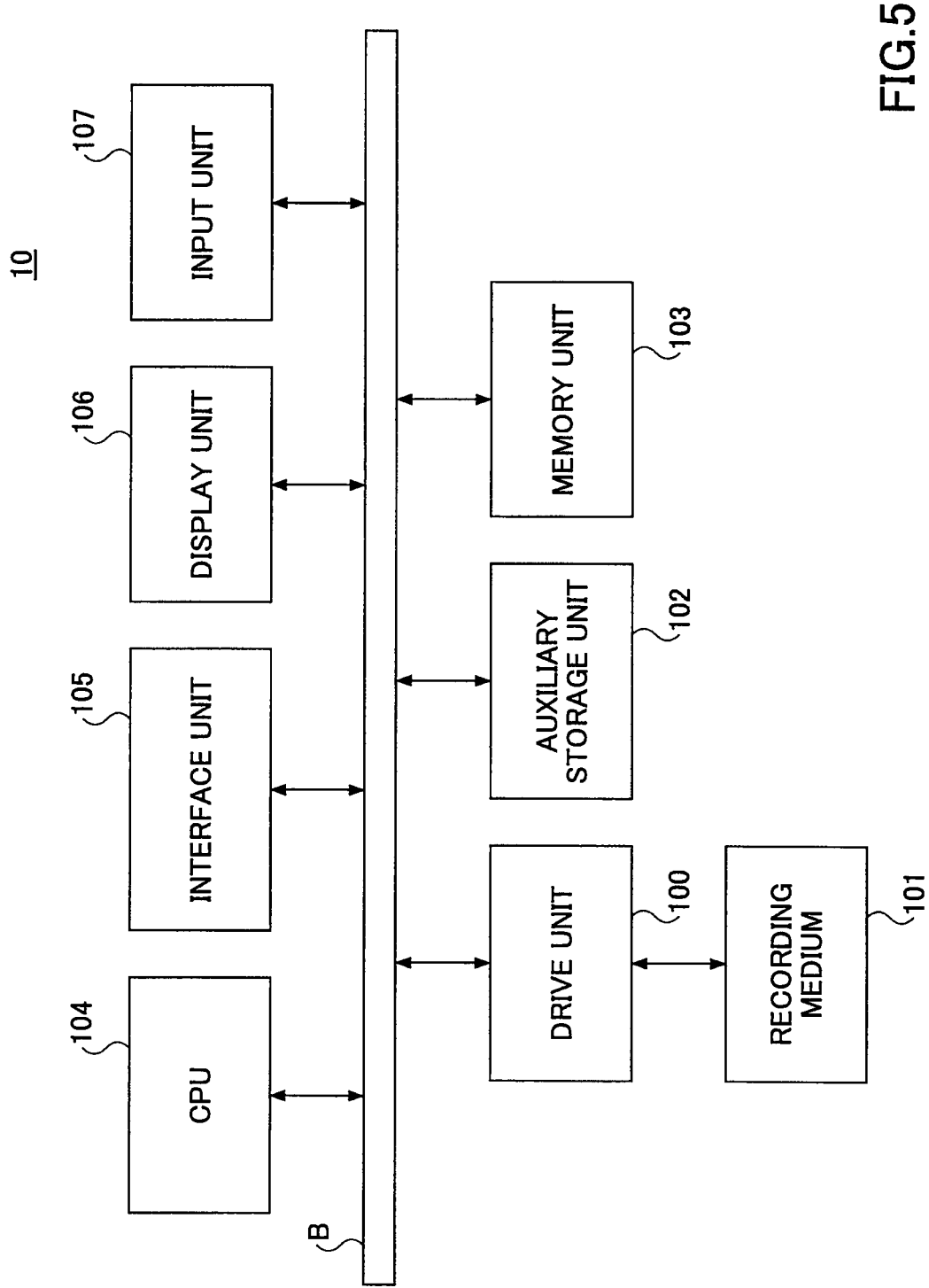
FIG. 5 is a diagram showing a hardware configuration example of a management server according to the embodiment of the present invention.

Next, the management server 10 is described in detail. FIG. 5 is a diagram showing a hardware configuration example of the management server according to the embodiment of the present invention. The management server 10 shown in FIG. 5 has a drive unit 100, an auxiliary storage unit 102, a memory unit 103, a CPU 104, an interface unit 105, a display unit 106, and an input unit 107, all of which are connected to one another via a bus B.

A program that implements processing in the management server 10 is provided from a recording medium 101 such as a CD-ROM. When the recording medium 101 having the program recorded therein is set in the drive unit 100, the program is installed from the recording medium into the auxiliary storage unit 102 via the drive unit 100. Note, however, that the program is not necessarily installed from the recording medium 101 but may be downloaded from other computers via a network. The auxiliary storage unit 102 stores not only the program thus installed but also necessary files, data, etc.

The memory unit 103 reads the program from the auxiliary storage unit 102 and stores the read program when receiving an instruction for activating the program. The CPU 104 implements a function related to the management server 10 in accordance with the program stored in the memory unit 103.

The interface unit 105 is used as an interface for network connection. The display unit 106 displays a GUI (Graphical User Interface), etc., according to the program. The input unit 107 is composed of a keyboard, a mouse, etc., and used for allowing the user to input various operational instructions.

Figure 6:
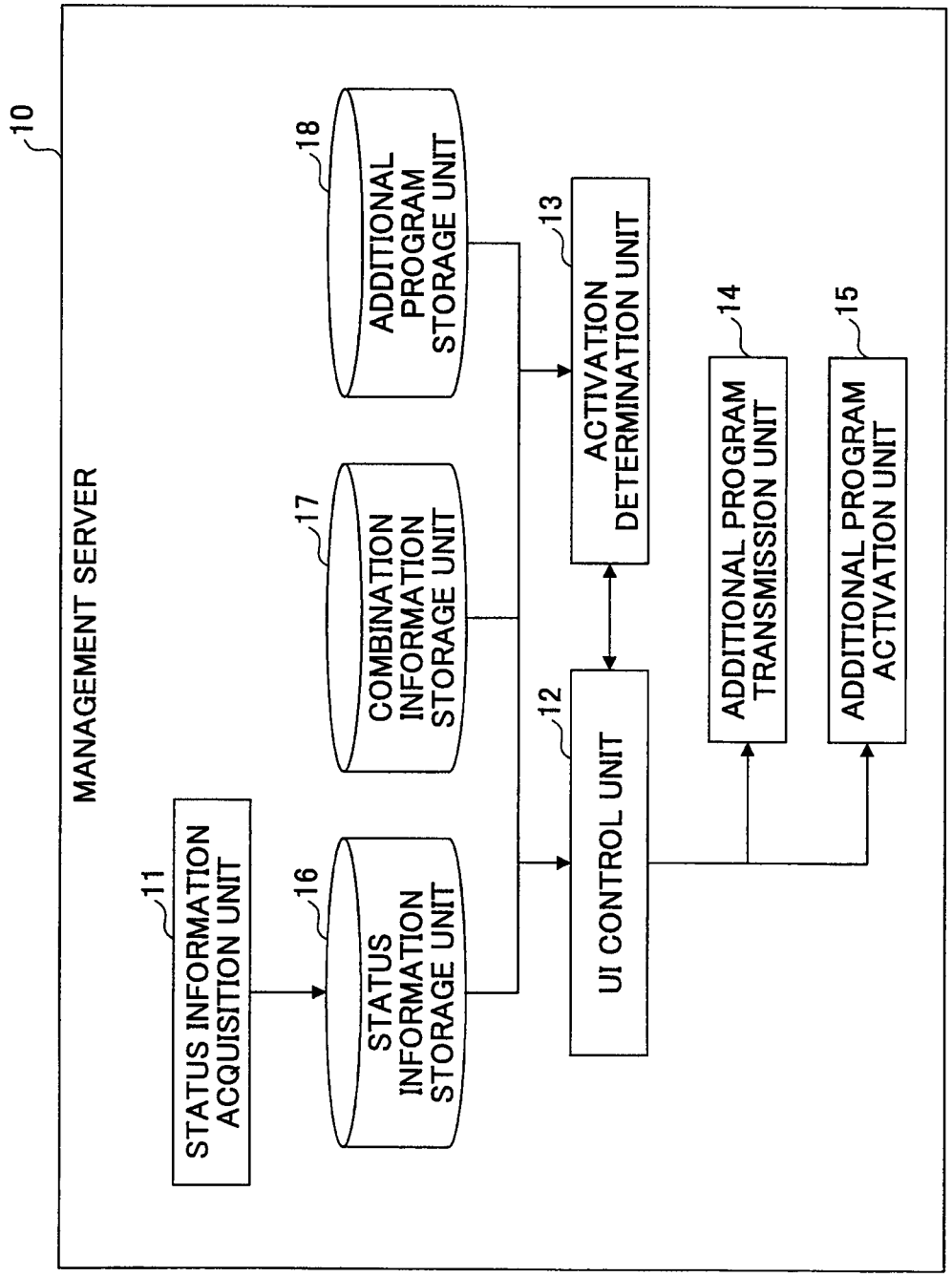
FIG. 6 is a diagram showing a function configuration example of the management server according to the embodiment of the present invention.

FIG. 6 is a diagram showing a function configuration example of the management server according to the embodiment of the present invention. In FIG. 6, the management server 10 has a status information acquisition unit 11, a UI control unit 12, an activation determination unit 13, an additional program transmission unit 14, an additional program activation unit 15, a status information storage unit 16, a combination information storage unit 17, an additional program storage unit 18, etc. Each of the units is implemented by the processing that the program installed in the management server 10 causes the CPU 14 to execute.

The status information acquisition unit 11 acquires list information on the additional programs having been transmitted to the equipment 20 and stores the acquired list information in the status information storage unit 16. The status information storage unit 16 is a storage region (in the form of file, table-type data, etc.) that stores the list information on the additional programs in the auxiliary storage unit 102. The UI control unit 12 causes a screen, which receives instructions for operating the additional programs (transmission of the additional programs to the equipment 20, activation of the additional programs, etc.), to be displayed. The activation determination unit 13 determines whether the additional programs are activated based on combination information showing a combination by which the additional programs can be activated (activation of the additional programs becomes meaningful) and the information stored in the status information storage unit 16. The combination information storage unit 17 is a storage region that stores the combination information in the auxiliary storage unit 102. The additional program transmission unit 14 transmits the additional programs specified by the user to the equipment 20. The additional programs to be transmitted are stored in the additional program storage unit 18. In other words, the additional program storage unit 18 is a storage region that stores the contents of the additional programs in the auxiliary storage unit 102. The additional program activation unit 15 transmits an instruction for activating the additional programs specified by the user to the equipment 20.

Figure 7:
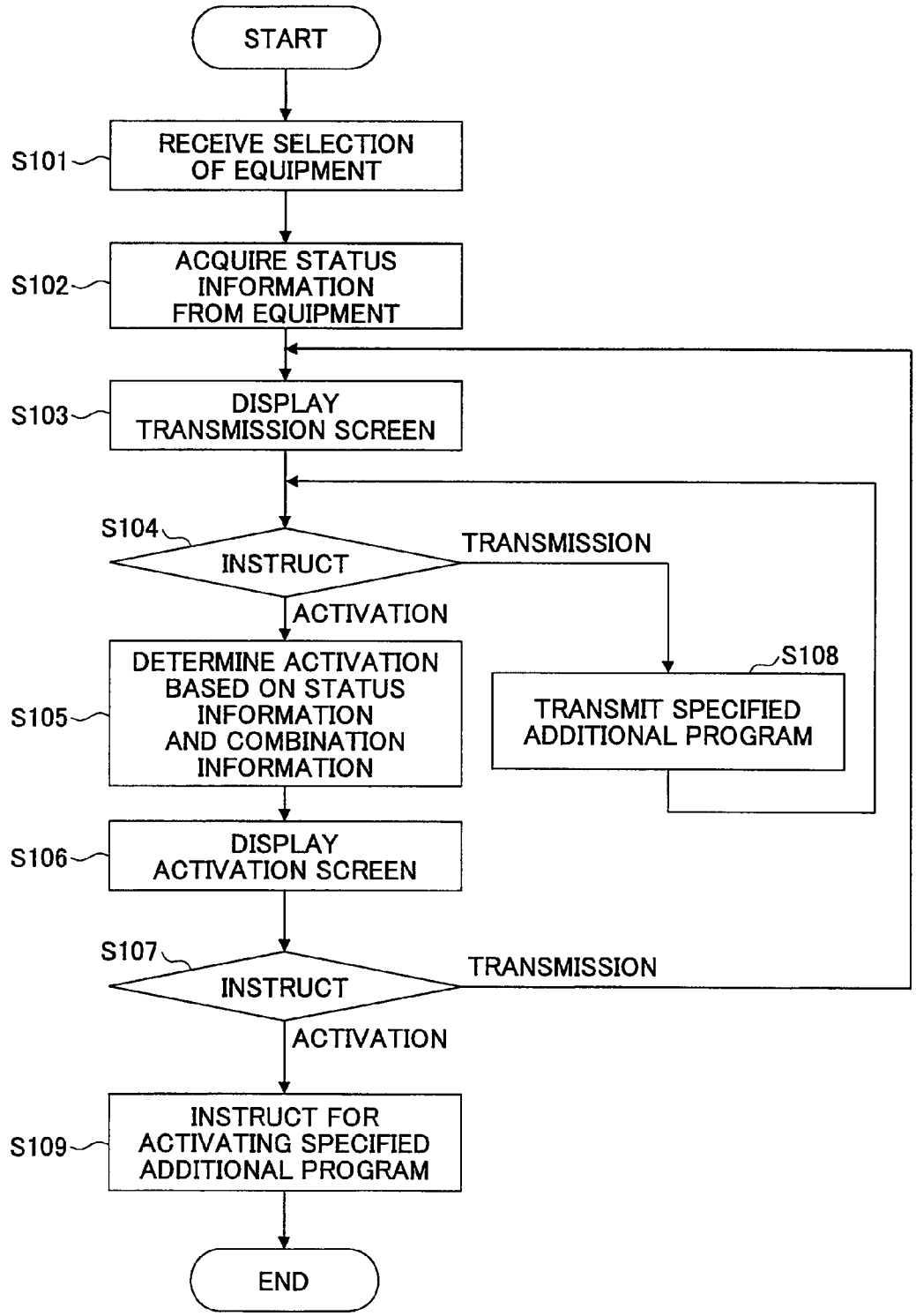
FIG. 7 is a flowchart for explaining a processing procedure by the management server.

Here, a processing procedure in the equipment management system 1 is described. FIG. 7 is a flowchart for explaining the processing procedure performed by the management server.

In step S101, the UI control unit 12 receives from the user an instruction for specifying the equipment 20 to be operated in relation to the additional programs. Further, the user may specify the equipment 20 to be operated by inputting identification information (such as a host name and an IP address; hereinafter referred to as an "equipment name") through the screen displayed by the UI control unit 12. Furthermore, the user may select from a list the equipment 20 to be operated in such a manner that an equipment search unit (not shown) searches for the equipment 20 on the network 50 and the UI control unit 12 causes a screen showing the list of the equipment including the equipment 20 to be displayed. In any case, the equipment name of the equipment 20 to be operated is specified in step S101. Here, it is assumed that the equipment 20a is specified as an object to be operated.

Then, the status information acquisition unit 11 acquires, from the equipment 20a related to the identification information specified in step S101, a list of status information items on the additional programs that has been transmitted to the equipment 20a and stored in the HDD 633 or the memory (MEM-P631) of the equipment 20a, and then stores the acquired list of the status information items in the status information storage unit 16 (S102).

FIG. 8 is a diagram showing a configuration example of the status information storage unit. As shown in FIG. 8, the status information storage unit 16 has an equipment name, an additional program name, a status, a program ID, a version, etc., for each of the transmitted additional programs.

The equipment name is the name of the equipment 20 to which the additional program has been transmitted. The additional program name is the name of the additional program. The status is the status of the additional program. The program ID is an identifier (ID) unique to each of the additional programs. The version is the version of the additional program.

FIG. 8 shows an example in which the additional programs "scan resolution enhancement patch" and "image processing function addition patch" have been transmitted to the equipment 20a named as "AAA."

Referring back to FIG. 7, the UI control unit 12 causes a screen (transmission screen), which urges the user to select the additional programs to be transmitted to the equipment 20a among those stored in the additional program storage unit 18, to be displayed on the display unit 106 (S103).

Figure 9:
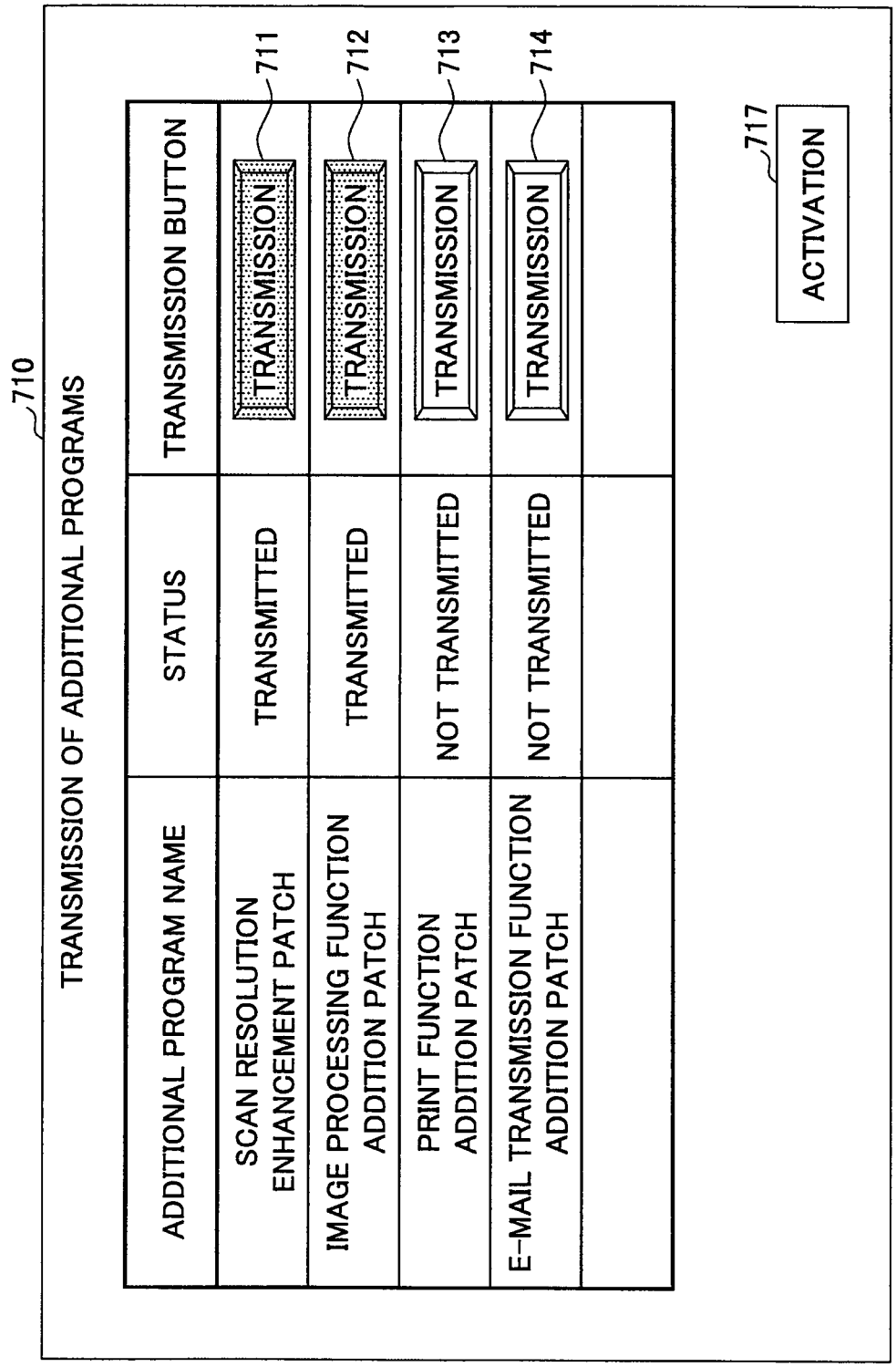
FIG. 9 is a diagram showing a display example of a transmission screen.

FIG. 9 is a diagram showing a display example of the transmission screen. In FIG. 9, the transmission screen 710 displays an additional program name, a status, and a transmission button for each of the additional programs stored in the additional program storage unit 18. The status is a status (not transmitted, transmitted, or activated) of the additional program. The transmission button is a button that receives an instruction for transmitting the additional program from the user. In FIG. 9, activation buttons 711 and 712 are grayed out, indicating an operation unable status. This is because the "scan resolution enhancement patch" and the "image processing function addition patch" have been transmitted to the equipment 20a. In other words, the UI control unit 12 identifies a list of the additional programs stored in the additional program storage unit 18 with the status information items related to the equipment 20a stored in the status information storage unit 16, thereby determining whether each of the programs has been transmitted to the equipment 20a. On the transmission screen 710, the UI control unit 12 displays the "status" of the additional program, which has been transmitted to the equipment 20a, as "transmitted," and makes the transmission button of the additional program grayed out. On the other hand, the UI control unit 12 displays the "status" of the additional program, which has not been transmitted to the equipment 20a, as "not transmitted," and sets the transmission button of the additional program in a state capable of being operated (pressed) by the user. Note that the additional program storage unit 18 stores not only the contents of the additional programs but also bibliographical information (a program name, a program ID, etc.) of each of the additional programs.

The transmission screen 710 also has an activation button 717. For example, when the user presses the activation button 717 ("activation" in step S104), the activation determination unit 13 determines whether each of the additional programs is activated based on the combination information stored in the combination information storage unit 17 and the status information items stored in the status information storage unit 16.

FIG. 10 is a diagram showing a configuration example of the combination information storage unit. As shown in FIG. 10, the combination information storage unit 17 stores combination information indicating the combination of the required additional programs according to objects (corresponding to objects). For example, it is shown that a "scan resolution enhancement patch," an "image processing function addition patch," and a "print function addition patch" should be activated at once so as to attain an object (functional enhancement) of enhancing copy resolution (enhancement of resolution capable of being handled by the copy activity 2101). Further, it is shown that the "scan resolution enhancement patch," the "image processing function addition patch," the "print function addition patch," and an "E-mail transmission function addition patch" should be activated at once so as to attain an object (functional enhancement) of enhancing ScanToEmail resolution (enhancement of resolution capable of being handled by the ScanToEmail activity 2101).

Accordingly, the activation determination unit 13 determines that the additional programs can be activated to achieve an object if all the additional programs required have been transmitted to the equipment. On the other hand, the activation determination unit 13 determines that the additional programs cannot be activated to achieve an object if any of the additional programs has not been transmitted to the equipment. Note that an object is not limited to functional enhancement but may include, for example, correction of bugs.

Figure 11A:
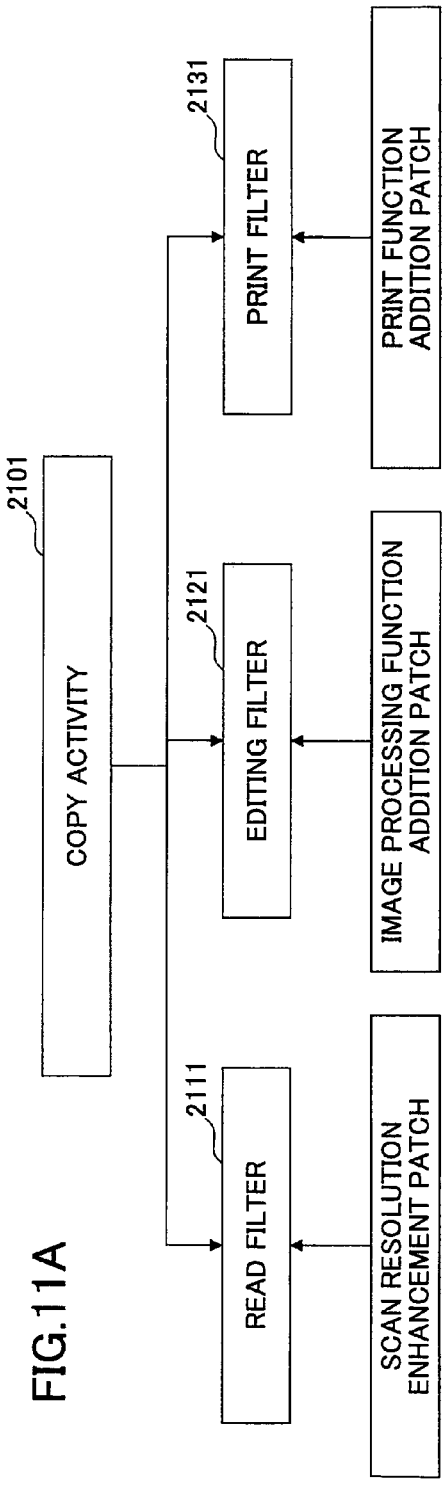
FIGS. 11A and 11B are diagrams showing a relationship between filters and additional programs.
Figure 11B:
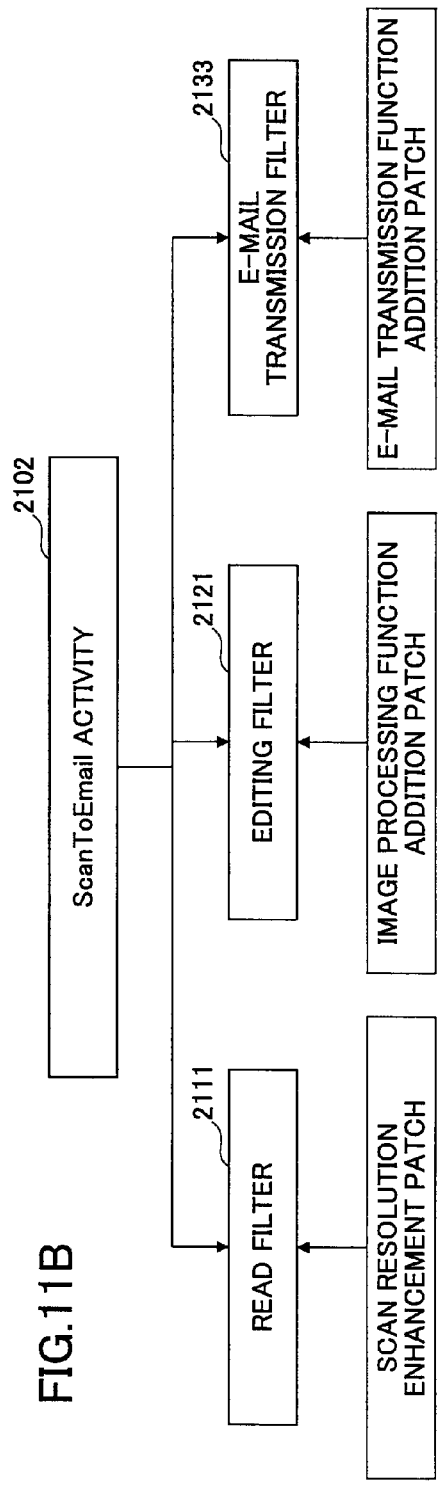

Here, the necessity of activating the plural additional programs at once is described with reference to FIGS. 11A and 11B. FIGS. 11A and 11B are diagram showing a relationship between the filters and the additional programs.

As shown in FIG. 11A, the copy activity 2101 uses the read filter 2111, the editing filter 2121, and the print filter 2131. In order to enhance resolution capable of being handled by the copy activity 2101, it is required to enhance the resolution capable of being handled by each of the filters used by the copy activity 2101. According to the embodiment, when the read filter 211 is an object to which the additional program is applied, the additional program that enhances resolution capable of being handled by the read filter 2111 is the scan resolution enhancement patch. Further, when the editing filter 2121 is an object to which the additional program is applied, the additional program that enhances resolution capable of being handled by the editing filter 2121 is the image processing function addition patch. Further, when the print filter 2131 is an object to which the additional program is applied, the additional program that enhances resolution capable of being handled by the print filter 2131 is the print function addition patch. If the additional program for enhancing the resolution is not applied to any of the filters, processing of the additional program for another filter becomes meaningless. Also, inconsistency may be caused in the processing between the filters, which in turn makes the whole processing of the copy activity 2101 unstable. This is because the application of the additional program to one filter is based on the application of the additional program to another filter. For this reason, the combination information makes it possible to determine such a relationship (dependence relationship) between the additional programs and avoid the meaningless application of the additional programs.

FIG. 11B shows a relationship between the filters and the additional programs used by the ScanToEmail activity 2112. The read filter 2111 and the editing filter 2121 used by the ScanToEmail activity 2112 are the same as those used by the copy activity 2101. An E-mail transmission function addition patch is applied to the E-mail transmission filter 2133.

Note that although FIG. 11B shows an example in which the additional programs are applied to different objects, the additional programs may be applied to the same filter. In other words, the additional programs may interrupt different parts (steps) of the same filter with their processing. Also in this case, there is a dependence relationship between the additional programs.

Referring back to FIG. 7, the UI control unit 12 causes the display unit 106 to display a screen (activation screen), which receives instructions for activating the transmitted additional programs, based on determination results of the activation determination unit 13 (S106).

FIG. 12 is a diagram showing a display example of the activation screen. As shown in FIG. 12, the activation screen 720 displays the additional program names and the statuses of the required additional programs required according to objects. Further, activation buttons are displayed according to the objects. For example, the activation button 721 receives an instruction for activating the three additional programs required to enhance copy resolution. Further, the activation button 722 receives an instruction for activating the three additional programs required to enhance ScanToEmail resolution.

Note that in FIG. 12, the activation buttons 721 and 722 are grayed out, which is based on determination results of the activation determination unit 13. In other words, as to the button 721, the activation determination unit 13 determines that the additional programs required to enhance the copy resolution cannot be activated (the activation determination unit 13 determines the unnecessity of activating the additional programs) since the print function addition patch has not been transmitted to the equipment. Further, as to the button 722, the activation determination unit 13 determines that the additional programs required to enhance the ScanToEmail resolution cannot be activated (the activation determination unit 13 determines the unnecessity of activating the additional programs) since the E-mail transmission function addition patch has not been transmitted to the equipment.

If the additional programs cannot be activated to achieve a desired object, the user presses a transmission button 725. When the transmission button 725 is pressed by the user ("transmission" in S107), the UI control unit 12 causes the transmission screen 710 to be displayed again (S103). For example, in order to enhance the copy resolution, the user presses a transmission button 713 on the transmission screen 710, which corresponds to the "print function addition patch" as the additional program (i.e., the additional program that has not been transmitted to the equipment) deficient in the combination of the additional programs required to enhance the copy resolution. When the transmission button 713 is pressed by the user ("transmission" in S104), the additional program transmission unit 14 acquires the print function addition patch from the additional programs and transmits the acquired print function addition patch to the equipment 20a (S108). After the transmission of the additional program, the additional program transmission unit 14 adds an entry on the transmitted additional program to the status information storage unit 16. This entry includes the name of the equipment 20a and the status "transmitted" with respect to the additional program. Thus, the additional program transmission unit 14 updates the information of the status information storage unit 16. In other words, the status of the equipment 20a and the information of the status information storage unit 16 are synchronized with each other. Accordingly, the processing of acquiring a list of status information items by the status information acquisition unit 11 is not necessarily required. However, if the synchronization between the status of the equipment 20a and the information of the status information storage unit 16 is not assured due, for example, to the existence of plural of the management servers 10, the processing of acquiring a list of status information items by the status information storage unit 11 is required.

When the activation button 717 is pressed by the user after the transmission of the print function addition patch, steps S105 and S106 are executed again so that the UI control unit 12 causes the activation screen 720 to be displayed.

Figure 13:
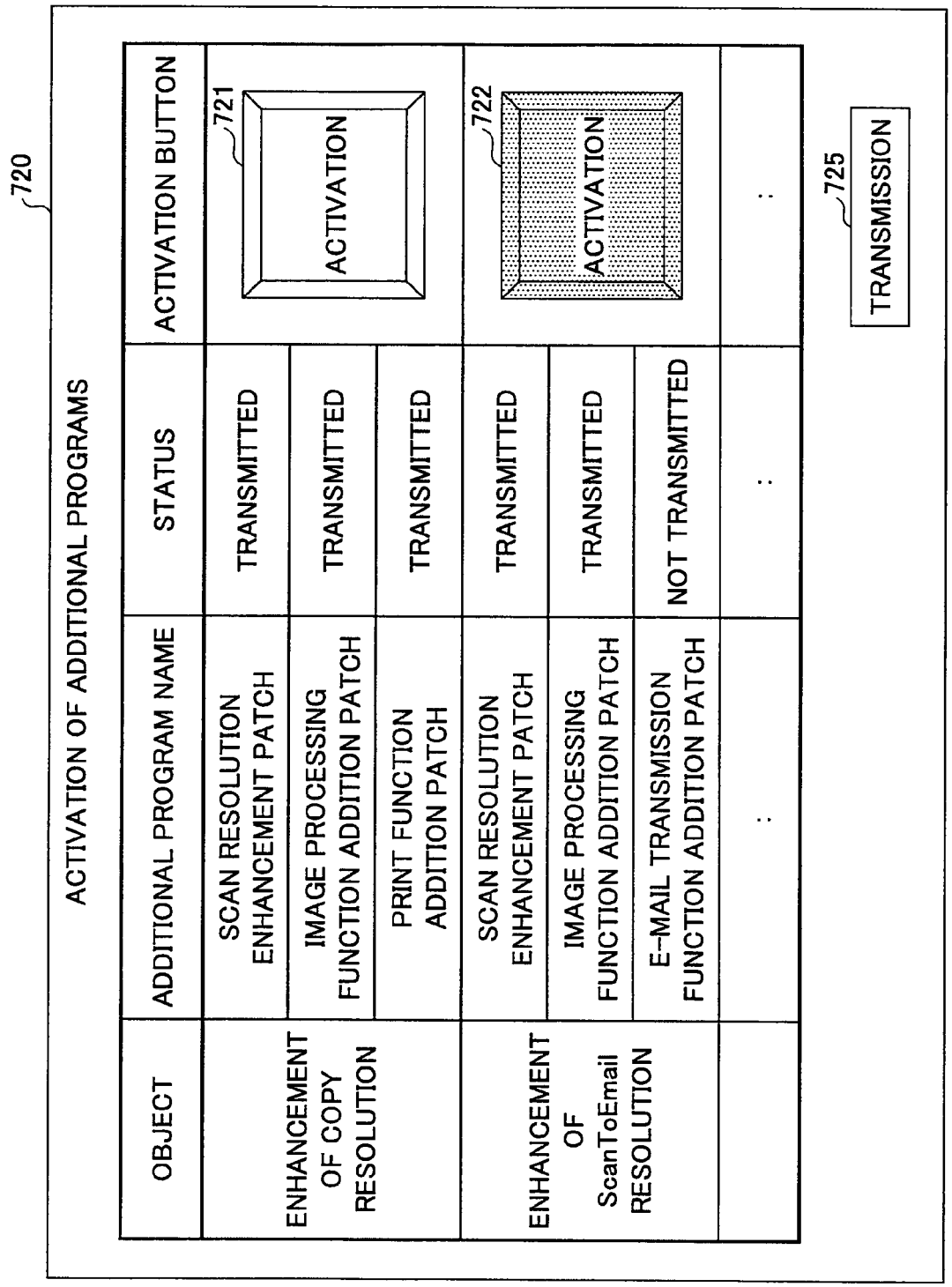
FIG. 13 is a diagram showing a second display example of the activation screen.

FIG. 13 is a diagram showing a second display example of the activation screen. In FIG. 13, the grayout of the activation button 721 is cancelled. This is because all the additional programs required to enhance the copy resolution have been transmitted to the equipment along with the transmission of the print function addition patch and thus the activation determination unit 13 determines that the additional programs can be activated.

Referring back to FIG. 7 again, when the activation button 721 is pressed by the user ("activation" in S107), the additional program activation unit 15 specifies the program IDs of the three additional programs corresponding to the activation button 721 and transmits an instruction for activating the additional programs to the equipment 20*a* (S109). The additional program activation unit 15 updates the "statuses" of the activated additional programs to "activated" in the status information storage unit 16.

Figure 14:
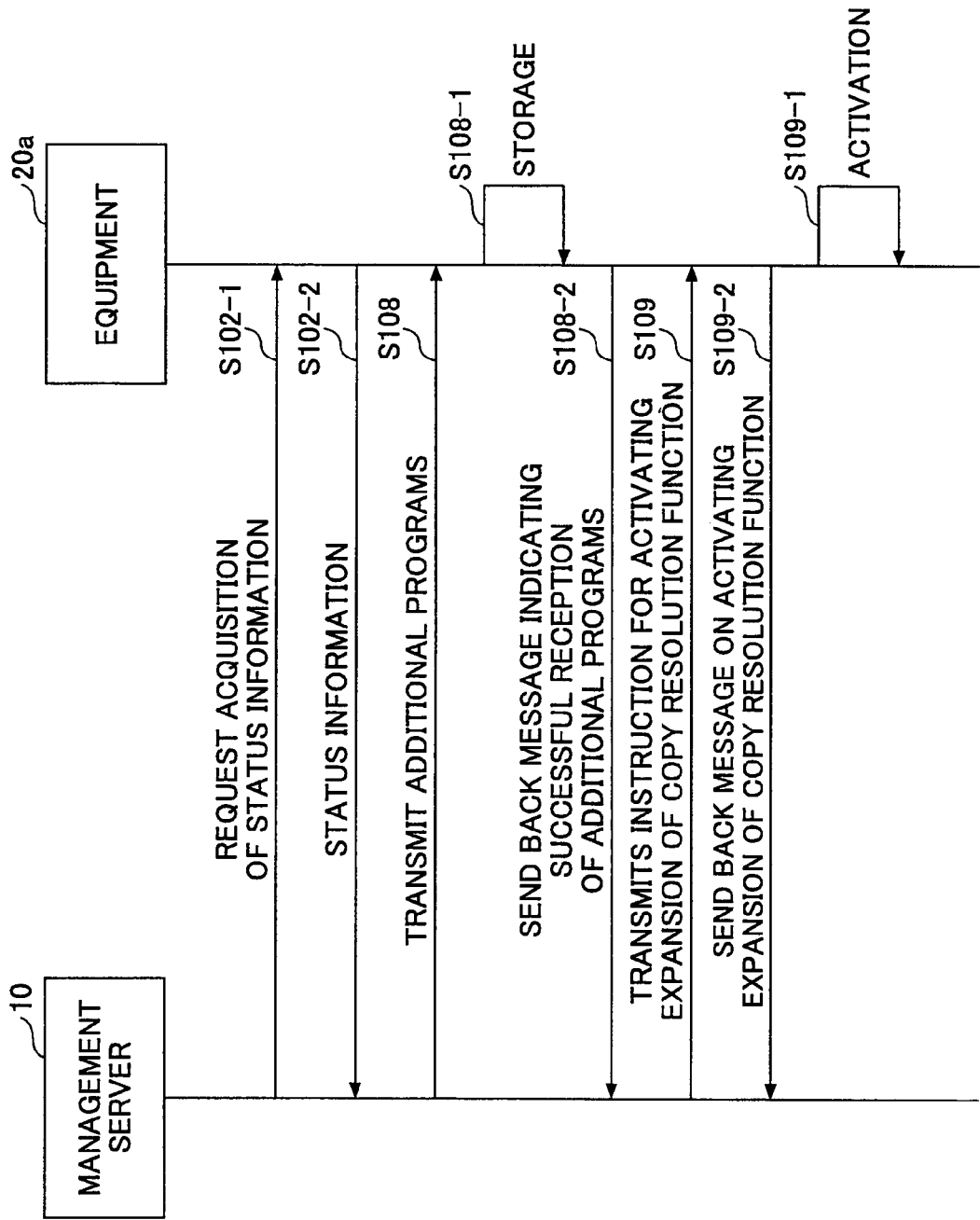
FIG. 14 is a sequence diagram for explaining a processing procedure by an equipment management system.

Next, a processing procedure executed in the equipment 20*a* in accordance with the execution of the processing shown in FIG. 7 is described. FIG. 14 is a sequence diagram for explaining a processing procedure by an equipment management system. Here, step numbers shown in FIG. 14 correspond to those shown in FIG. 7.

In step S102-1, when the management server 10 transmits a request for acquiring the status information items of the additional programs to the equipment 20*a*, the additional program control unit 243 of the equipment 20*a* generates a list of the status information items of the additional programs stored in the HDD 630 or the memory and sends back the list to the management server 10 (S102-2).

Then, when the additional program transmission unit 14 of the management server 10 transmits the additional programs to the equipment 20*a* (S108), the additional program control unit 243 of the equipment 20*a* stores the received additional programs in the memory (S108-1). Next, the additional program control unit 243 sends back a message indicating the successful reception of the additional programs to the management server 10 (S108-2).

Then, when the additional program activation unit 15 of the management server 10 specifies the program IDs of the additional programs to be activated and transmits an instruction for activating the additional programs to the equipment 20*a* (S109), the additional program control unit of the equipment 20*a* activates the additional programs corresponding to the specified IDs (S109-2). Next, the additional program control unit 243 sends back a message indicating the successful activation of the additional programs to the management server 10 (S109-2).

As described above, the management server 10 according to the embodiment automatically determines whether the additional programs can be activated based on list information on the additional programs having been transmitted to the equipment 20 and the combination information showing a combination by which the additional programs can be activated. Accordingly, the proper application of the additional programs can be assisted. That is, it is possible to properly prevent abnormal operations, etc., of a program, to which the additional programs are applied, caused when only some of the additional programs having a dependence relationship are activated.

Note that after the activation determination unit 13 determines whether the additional programs can be activated according to an object, the additional program transmission unit 14 may automatically transmit the program, which has not been transmitted to equipment (deficient in the combination), among those related to the object for which it is determined that the additional programs cannot be activated.

Similarly, after the activation determination unit 13 determines whether the additional programs can be activated according to objects, the additional program activation unit 15 may automatically transmit an instruction for activating the additional programs related to the object for which it is determined that the additional programs can be activated.

Further, the additional programs may be activated on the side of the equipment 20*a*. In other words, an instruction for activating the additional programs may be input via the operations panel 602 of the equipment 20 rather than being transmitted from the management server 10.

Further, the image forming apparatus is used as an example of equipment in the embodiment, but equipment to which the embodiment of the present invention can be applied is not limited to the image forming apparatus. For example, the embodiment of the present invention can be effectively applied to various digital appliances, mobile phones, general-purpose computers, etc.

The present invention is not limited to the specifically disclosed embodiments, and variations and modifications may be made without departing from the scope of the present invention.

The present application is based on Japanese Priority Application No. 2009-161104 filed on Jul. 7, 2009, the entire contents of which are hereby incorporated herein by reference.

What is claimed is:

1. An information processing apparatus capable of interrupting an existing object program among a plurality of object programs included in equipment connected to a network, comprising:

a list information storage unit configured to store list information on additional programs transmitted to the equipment connected via a network, each additional program being configured to contribute to at least one of correcting a bug and enhancing a function of at least one of the object programs on the equipment;

a combination information storage unit configured to store combination information indicating plural combinations of the additional programs, each combination including additional programs required to achieve a function, from at least one of correcting a bug and enhancing a function of a separate one of the object programs, associated with the combination, wherein at least one of the additional programs is not dedicated to a single object program and is stored as part of two separate and different combinations for two separate and different object programs;

a determination unit configured to determine whether an activation of the additional programs transmitted to the equipment is possible based on the list information and a combination associated with a desired function included in the combination information; and a transmission unit configured to transmit an additional program deficient in the combination associated with the desired function and included in the combination information to the equipment if the activation of the additional programs is determined to be impossible, wherein when the determination unit determines that the activation of the additional programs is possible, one of the additional programs transmitted to the equipment is activated with respect to an object program which has become a target due to the activation.

2. The information processing apparatus according to claim 1, further comprising:
an activation instruction unit configured to transmit an instruction for activating the additional programs to the equipment if the activation of the additional programs is determined to be possible.

3. The information processing apparatus according to claim 2, further comprising:
a display control unit configured to cause a screen, which allows a user to input the instruction for activating the additional programs, to be displayed if the activation of the additional programs is determined to be possible; wherein
the activation instruction unit transmits the instruction for activating the additional programs to the equipment in response to an input by the user to instruct the activation of the additional programs via the screen.

4. The information processing apparatus according to claim 1, wherein the determination unit determines that the activation of at least one of the additional programs is possible further based on use permit information indicating whether the at least one additional program, which is to be executed in one program execution environment, is executable in another program execution environment.

5. An information processing method executed by an information processing apparatus capable of interrupting an object program among a plurality of object programs included in equipment connected to a network, comprising:
determining whether an activation of additional programs transmitted to the equipment is possible based on a list information storage unit and a combination of additional programs associated with a desired function and included in a combination information storage unit, each additional program being configured to contribute to at least one of correcting a bug and enhancing a function of at least one of the object programs on the equipment, the list information storage unit configured to store list information on the additional programs transmitted to the equipment connected via a network, the combination information storage unit configured to store combination information indicating plural combinations of the additional programs, each combination including additional programs required to achieve a function, from at least one of correcting a bug and enhancing a function of a separate one of the object programs, associated with the combination, wherein at least one of the additional programs is not dedicated to a single object program and is stored as part of two separate and different combinations for two separate and different object programs; and
transmitting an additional program deficient in the combination associated with the desired function and included in the combination information to the equipment if the activation of the additional programs is determined to be impossible; wherein
the determining further determines that the activation of the additional programs is possible, and one of the additional programs transmitted to the equipment is activated with respect to an object program which has become a target due to the activation.

6. The information processing method according to claim 5, further comprising:
transmitting an instruction for activating the additional programs to the equipment if the activation of the additional programs is determined to be possible.

7. The information processing method according to claim 6, further comprising:
causing a screen, which allows a user to input the instruction for activating the additional programs, to be displayed if the activation of the additional programs is determined to be possible; wherein,
in the transmitting the instruction, the instruction for activating the additional programs is transmitted to the equipment in response to an input by the user to instruct the activation of the additional programs via the screen.

8. A non-transitory computer-readable storage medium having computer readable program codes embodied in the computer readable storage medium that, when executed, perform an information processing method executed by an information processing apparatus capable of interrupting an object program among a plurality of object programs included in equipment connected to a network and cause a computer to execute:
determining whether an activation of additional programs transmitted to the equipment is possible based on a list information storage unit and a combination of additional programs associated with a desired function and included in a combination information storage unit, each additional program being configured to contribute to at least one of correcting a bug and enhancing a function of at least one of the object programs on the equipment, the list information storage unit configured to store list information on the additional programs transmitted to the equipment connected via a network, the combination information storage unit configured to store combination information indicating plural combinations of the additional programs, each combination including additional programs required to achieve a function, from at least one of correcting a bug and enhancing a function of a separate one of the object programs, associated with the combination, wherein at least one of the additional programs is not dedicated to a single object program and is stored as part of two separate and different combinations for two separate and different object programs; and
transmitting an additional program deficient in the combination associated with the desired function and included in the combination information to the equipment if the activation of the additional programs is determined to be impossible; wherein
the determining further determines that the activation of the additional programs is possible, and one of the additional programs transmitted to the equipment is activated with respect to an object program which has become a target due to the activation.

9. The non-transitory computer-readable storage medium according to claim 8, further comprising:
transmitting an instruction for activating the additional programs to the equipment if the activation of the additional programs is determined to be possible.

10. The non-transitory computer-readable storage medium according to claim 9, further comprising:
causing a screen, which allows a user to input the instruction for activating the additional programs, to be displayed if the activation of the additional programs is determined to be possible; wherein,
in the transmitting the instruction, the instruction for activating the additional programs is transmitted to the equipment in response to an input by the user to instruct the activation of the additional programs via the screen.

* * * * *